United States Patent Office 3,408,375
Patented Oct. 29, 1968

3,408,375
PROCESS FOR MAKING TETRAMETHYL LEAD
Rudolph Louis Pedrotti, Charles Anthony Sandy, and Victor Tullio, New Castle County, Del., assignors to E. I. du Pont de Nemours and Company, Wilmington, Del., a corporation of Delaware
No Drawing. Filed Oct. 7, 1965, Ser. No. 493,927
6 Claims. (Cl. 260—437)

ABSTRACT OF THE DISCLOSURE

Manufacture of tetramethyl lead by reaction of monosodium lead alloy with methyl chloride in the presence of a catalyst which comprises from 0.05 to about 1 mole of methylamine per mole of alloy and from 0 to about 0.01 mole of water per mole of alloy.

---

This invention relates to the manufacture of tetramethyl lead, more particularly to its manufacture by the reaction of methyl chloride with monosodium lead alloy in the presence of a novel and improved catalyst system.

For many years, only tetraethyl lead was of commercial value as an antiknock agent for motor gasoline. Therefore, the early art was concerned with developing processes for manufacturing tetraethyl lead and, assuming that all tetraalkyl lead compounds (including tetramethyl lead) could be made in the same manner under the same conditions as tetraethyl lead, alleged that their processes could be used in making all tetraalkyl lead compounds. These early inventors reacted ethyl halides, usually ethyl bromide, with sodium-lead alloys which contained 2 or more atoms of sodium per atom of lead ($Na_4Pb$ or $Na_2Pb$) in the presence of large amounts of water or its equivalent, to react with the excess sodium to release hydrogen and produce strong reducing conditions. They also proposed the use of catalysts, such as amines, e.g., pyridine and aniline, and ethers, in their process. See for example, Calcott in U.S. Patent 1,559,405 and Midgley, Jr., in U.S. Patent 1,622,228.

However, Calingaert et al., in U.S. Patent 2,270,109, found that methyl chloride alone or in admixture with ethyl chloride could not be made to react successfully with monosodium lead alloy (NaPb) except in the presence of certain metal catalysts, mainly aluminum type catalysts. In U.S. Patent 2,535,190, Calingaert et al. found that ethyl chloride would react well with sodium lead alloy at low temperatures if such alloy also contained a certain amount of magnesium (Mg) and in the presence of tertiary amines as catalysts, specifying that the Mg was essential to obtain good results. They also indicated that such process could be used to make all tetraalkyl lead compound, including tetramethyl lead, but did not disclose any experiments with methyl chloride. In U.S. Patent 2,635,106, Shapiro et al. disclosed that ethyl chloride could be reacted with a ternary potassium-sodium-lead alloy to produce tetraethyl lead, and that the yield could be increased by the presence of various catalysts of a long list, including amines, e.g., methylamine, and that none of such catalysts improve the yield on NaPb (monosodium lead) alloy to any extent. They did not disclose or contemplate the use of methyl chloride or the production of tetramethyl lead.

As also disclosed in the more recent art, the manufacture of tetramethyl lead poses difficulties, as discussed by Jarvie et al., in U.S. Patent 3,048,610, Tuillo in U.S. Patents 3,072,694 and 3,072,695, and Cook et al. in U.S. Patent 3,049,558. This art suggests that the MeCl-NaPb system is unique since it requires catalysis, and certain metal compounds are effective catalysts to produce TML. The disclosed processes, however, including the commercial proceses involving aluminum compounds, are not entirely satisfactory mainly because the alkyl aluminum derivatives formed in the reaction mass are sensitive to air and moisture and tend to ignite spontaneously on exposure to the atmosphere. Also, the reaction masses are sticky and troublesome to discharge from the reactor.

Pedrotti and Sandy, in their copending application, Ser. No. 293,138, filed July 5, 1965, now U.S. Patent No. 3,281,442, have disclosed that tetramethyl lead can be manufactured by reacting monosodium lead alloy with liquid methyl chloride at from about −20° C. to about 120° C. in the presence of a catalyst system which consists essentially of from 0.01 to about 1.5 moles of ammonia per mole of alloy, from 0 to about 0.04 mole of water per mole of alloy but not more than 0.3% by weight based on the methyl chloride, and from 0 to about 0.04 mole per mole of alloy of a monohydric organic compound of the formula ROH wherein R represents a member of the group consisting of hydrocarbon and oxahydrocarbon radicals of 1–18 carbon atoms. They found that ammonia is a very effective catalyst for this reaction, having many advantages over the aluminum-based catalysts of the prior art, that the small amounts of water and of the monohydroxylic organic compound exert a marked cocatalyst effect to increase the ammonia-catalyzed methylation reaction and/or the specificity of that reaction, and that they thereby avoid the disadvantages and hazards involved in the use of aluminum based catalysts. Still further improvements in the process of making tetramethyl lead are desirable.

It is an object of this invention to provide a new and improved process for making tetramethyl lead by the reaction of methyl chloride with monosodium lead alloy. A particular object is to provide such a process which employs a novel and improved catalyst system for such reaction which avoids the use of aluminum type catalysts and the hazards and problems involved in their use. A further object is to provide such a process in which the reaction is initiated smoothly and safely at relatively low temperatures and pressures and which renders the manufacture of tetramethyl lead significantly more safe and practical. Other objects are to advance the art. Still other objects and advantages will appear hereinafter.

The above and other objects of this invention are accomplished by the process for making tetramethyl lead which comprises reacting monosodium lead alloy with (A) a methylating agent which consists essentially of methyl chloride in the liquid phase, employing at least 1 mole of methyl chloride per mole of alloy,
(B) at a temperature of from about 20° C. to 130° C.,
(C) in the presence of a catalyst system which consists essentially of (a) from 0.05 to about 1 mole of methylamine per mole of alloy, and (b) from 0 to about 0.01 mole of water per mole of alloy.

It has been found that the methylamine ($CH_3NH_2$), when employed in the above specified proportions under the above recited conditions, is highly effective to catalyze the reaction of methyl chloride with monosodium lead alloy whereby the methylation is initiated and brought to completion smoothly and rapidly under mild conditions of temperature and pressure to produce high yields of tetramethyl lead. The methylamine does not require a metal catalyst such as Mg or the aluminum type catalysts and its use avoids the hazards of making and handling aluminum type catalysts and the difficulties involved in processing reaction masses produced by the use of metal catalysts. Thereby, the manufacture of tetramethyl lead is rendered significantly more safe, practicable and economical.

The reaction is carried out in the liquid phase with the methyl chloride in a proportion of at least 1 mole per mole of alloy, usually from about 1.3 moles to about 6 moles, and preferably from about 1.3 moles to about 3 moles for a batch process and from about 4 moles to about 6 moles in a continuous process.

The temperature may be in the range of from about 20° C. to 130° C. and preferably will be from about 50° C. to about 90° C.

Methylamine is critical. Without it, practically no tetramethyl lead is produced. In contrast, dimethylamine and trimethylamine are practically ineffective to catalyze NaPb methylation. Also methylamine homologs, such as ethylamine and butylamine, are much less effective, as are aromatic amines such as aniline and pyridine. In other words, methylamine, like ammonia (Pedrotti and Sandy, in Ser. No. 293,138, filed July 5, 1963), ethylenediamine and 2-methyloxyethylamine (Sandy, in Ser. No. 456,478, filed May 17, 1965), is unique among the nitrogen bases for this reaction.

The methylamine may be employed in the proportion of from 0.05 to about 1 mole per mole of alloy, preferably from about 0.1 to about 0.5 mole.

Monosodium lead alloy (NaPb) used in this process, i.e. containing 50 mole percent Na and 50 mole percent Pb, or on a weight basis 10% wt. Na and 90% wt. Pb, has been amply described in the art. It may be used in various forms, usually comminuted, including ground as disclosed by Stecher in U.S. Patent 2,134,091, flaked as disclosed by Pyk in U.S. Patent 2,561,636 or by Tanner in U.S. Patent 2,635,107, and quenched (in MeCl) as described by Mattison in U.S. Patent 2,744,126.

The methyl chloride may contain rather large proportions of water. In contrast to prior practices regarding the alkylation of monosodium lead alloy, it is not critical for practical operation to exclude or limit moisture to very low levels. Methyl chloride, containing 50 p.p.m. (parts per million) or less of water, is generally considered in this art to be substantially anhydrous. For example, in aluminum-catalyzed methylations, it is considered desirable to limit the water content of the methyl chloride to less than 150 p.p.m. (0.015% wt.) and in general to operate as anhydrously as possible, both costly expedients. In the process of this invention, substantially greater quantities of water can be tolerated, for example corresponding to as high as about 1000 p.p.m. based on the methyl chloride or about 0.1% by weight, provided that the total water introduced does not exceed about 0.01 mole/mole of alloy. Usually, the water will be in the range of about 50 to about 500 p.p.m. based on the methyl chloride and from about 0.0004 to about 0.005 mole/mole of alloy. This has a commercially important advantage because the methyl chloride and the methylamine ordinarily contain small amounts of water and it is not economically practical to provide completely anhydrous materials.

Broadly, the overall process comprises (1) mixing the alloy, methyl chloride, and the methylamine, (2) holding such mixture at a temperature in the range of about 20° C. to about 130° C., at which the reaction begins and proceeds at a reasonable rate, and (3) recovering the tetramethyl lead from the reaction mass. Normally, the reaction is effected under agitation and it is usually desirable to effect the reaction in the presence of an inert solid, such as graphite, as an internal lubricant. From about 1–5% by weight of the alloy may be used, depending on the dimensions of the reactor, the effectiveness of the agitation means, and the proportions of the reactants. There may also be present a thermal stabilizer for tetramethyl lead, as described by Jarvie et al. in U.S. Patent 3,048,610 and Cook et al. in U.S. Patent 3,049,558, for example a volatile hydrocarbon, such as toluene or isooctane, having boiling characteristics comparable to those of tetramethyl lead.

The reactants, methylamine catalyst and other agents as described above may be introduced separately or together, all at once or gradually during the course of the reaction. The methylamine may be added as such or in a carrier which conveniently may be an inert solvent, including the thermal stabilizers toluene and isooctane. The methylamine ($MeNH_2$), being normally gaseous like the methyl chloride (MeCl), may be charged to the reactor as condensed liquid or as pressurized vapor.

The reaction mass components may be mixed at low temperatures at which the reaction does not proceed at a substantial rate, e.g. below 0° C., and the mixture then brought to operating temperatures. Or the reactants and other essential components may be brought into contact at temperatures within the desired reaction temperature range. The reaction may be conducted batchwise or continuously.

An important feature of this invention is that the methylamine catalyst system effects the reaction at moderate temperatures and autogenous pressures, e.g. at about 50° C. to about 90° C. corresponding to pressures of from about 150 to about 400 p.s.i.g. Reaction mass temperatures are readily controlled by controlling the amount and schedule of catalyst and methyl chloride addition, by cooling where necessary, and by refluxing methyl chloride to keep the internal pressure at safe levels, e.g. below 300 p.s.i.g. The internal pressure should be sufficient to maintain the methyl chloride in the liquid phase, or under reflux pressure.

The resulting reaction mass may be worked up in the usual way described in the art. Normally, the residual methyl chloride is vented from the charge at a temperature in the range of from about 25° C. to about 60° C. and is passed to a recovery system as in tetraethyl lead technology. For this purpose, the reaction mass temperature is adjusted accordingly. The tetramethyl lead is then recovered by solvent extraction, e.g. with toluene, or by steam distillation according to the well-known techniques.

In order to more clearly illustrate this invention, representative modes of practicing it and advantageous results to be obtained thereby, the following examples are given in which the parts and proportions are by weight unless otherwise indicated. Also, in the examples, "Y, %" is the percent of the theoretical yield of tetramethyl lead based on the quantity of alloy employed; "C, %" is the total percent of the alloy consumed by reaction to produce tetramethyl lead and other products, and "Y/C" is the ratio of the percent yield of tetramethyl lead (and of the percent of the alloy that is consumed in producing tetramethyl lead) to the total percent alloy consumed in all reactions. Thus, Y/C is a measure of the reaction specificity to produce tetramethyl lead, the difference between 1.00 and the given values of Y/C, times 100, being the percent alloy consumed in side reactions.

Example 1.—$MeNH_2$-catalyzed MeCl-NaPb reaction and comparison with other amines General procedure: a steel bomb was charged with (a) 100 parts crushed 10 on 20 mesh NaPb enclosed in a glass ampoule, and (b) amines as described below. The bomb was cooled to —70° C., its atmosphere evacuated, and 77.5 or 130 parts MeCl were admitted from a pressurized source, corresponding to a loading density of 0.52 or 1.2 gram MeCl/cc. of bomb capacity. At about 0° C., the closed bomb was struck sharply against a solid object to break the ampoule, placed in a preheated oil bath, and its contents vigorously agitated by shaking. Reaction was terminated by cooling to —70° C., and the tetramethyl lead recovered by extracting the reaction mass with toluene.

REACTION CONDITIONS

|  | I | II | III |
|---|---|---|---|
| Molar MeCl/NaPb | 3.5 | 5.9 | 5.9 |
| $H_2O$ in MeCl, p.p.m | 94 | 94 | 258 |
| Molar $H_2O$/NaPb | .0009 | .0015 | .004 |
| Molar $MeNH_2$/NaPb |  | As given below |  |
| Bath temperature |  | As given below |  |
| Reaction time, hr | 1 | 1 | 1 |

RESULTS

| Catalyst | Conditions | Molar Amine/NaPb | Temp., °C. | Percent Y | Percent C | Y/C |
|---|---|---|---|---|---|---|
| $MeNH_2$ | I | .29 | 25 | 76 | 89 | .85 |
| | II | .29 | 85 | 45 | 59 | .76 |
| | II | .73 | 85 | 49 | 100 | .49 |
| | III | .15 | 30 | 64 | 77 | .83 |
| $Me_2NH$ | I | .20 | 25 | nil | 16 | ---- |
| | I | .20 | 110 | 2 | 18 | .11 |
| | II | .51 | 85 | nil | 17 | ---- |
| $Me_3N$ | I | .16 | 25 | 1 | 9 | .11 |
| | II | .39 | 85 | 1 | 7 | .14 |
| $EtNH_2$ | I | .20 | 25 | 3 | 12 | .25 |
| | I | .20 | 85 | 2 | 26 | .08 |
| n-$BuNH_2$ | I | .13 | 25 | 3 | 12 | .25 |
| | I | .13 | 110 | 13 | 49 | .26 |
| Pyridine | I | .12 | 25 | 3 | 8 | .31 |
| Aniline | I | .10 | 25 | nil | 15 | ---- |
| | I | .10 | 110 | 11 | 26 | .43 |

Example 2

The procedure of Example 1 was repeated with 1.88 moles MeCl per mole NaPb (corresponding to 0.64 gram MeCl/cc. bomb space), $MeNH_2$, in quantities tabulated below, and added toluene, 3.8% by weight of the alloy, as TML thermal stabilizer. The MeCl contained 25 p.p.m. $H_2O$, the $MeNH_2$ 2500 p.p.m. $H_2O$; the total $H_2O$ thus added is expressed below as moles/mole NaPb. The oil bath temperature was 50° C. for 1 hour reaction time.

RESULTS

| Molar $MeNH_2$/NaPb | Molar $H_2O$/NaPb | TML Yield | Aloy Conv. | Y/C |
|---|---|---|---|---|
| .07 | .0004 | 29 | 38 | .76 |
| .15 | .0008 | 66 | 82 | .80 |
| .30 | .0014 | 76 | 100 | .78 |
| .38 | .0017 | 80 | 100 | .80 |
| .52 | .0022 | 68 | 100 | .68 |

Example 3

The following example shows that methylamine (commercial "anhydrous" $MeNH_2$) is highly effective to catalyze the NaPb-MeCl reaction in short contact times. The $MeNH_2$-$H_2O$ system appears superior to the best ammonia catalyst system known to date ($NH_3$+MeOH of Pedrotti and Sandy) at short reaction periods as judged by Parr Bomb results tabulated below.

These runs were conducted under the general procedure of Example 1 except that the reactor was fitted with internal temperature probes to measure the internal temperature developed during the course of the reaction. The heat kick can be considerable, raising the temperature well above that of the bath. The use of such internal temperature probes is described by Tullio in U.S. Patent 3,072,695. The MeCl used contained 50–75 p.p.m. $H_2O$ and the "anhydrous" $MeNH_2$ contained 4000 p.p.m. $H_2O$. The total amount of water introduced corresponds to .0028 mole/mole NaPb. In the $NH_3$-catalyzed runs, methanol was present in amounts corresponding to 1200 p.p.m. based on the methyl chloride. It is believed that essentially the same results, perhaps one or two percent less TML, would be obtained on replacing the MeOH in the ammonia process by $H_2O$ and using the same amount of $H_2O$ as was used with $MeNH_2$. The results are tabulated below.

COMPARISON OF $CH_3NH_2$ VS. $NH_3$ CATALYSIS IN PARR BOMBS AT SHORT REACTION PERIODS
Molar MeCl/NaPb=3.5
Molar Catalyst/NaPb=.3

| Catalyst | Time, min. | Temperature, °C. Bath | Temperature, °C. Max. Internal | Percent TML Yield | Percent Conv. |
|---|---|---|---|---|---|
| $CH_3NH_2$ | 10 | 50 | 73 | 90.4 | 99.0 |
| $CH_3NH_2$ | 5 | 50 | 82 | 97.2 | 98.7 |
| $CH_3NH_2$ | 5 | 50 | 92 | 79.2 | 99.3 |
| $NH_3$ | 10 | 50 | 55 | 70.7 | 86.9 |
| $NH_3$ | 10 | 50 | 55 | 60.7 | 78.6 |

Not only are the TML yields better with $MeNH_2$, but the higher internal temperatures developed with it constitute further evidence of a faster reaction rate which could be important in continuous operation. The continuous operation may be carried out as described by Schlaudecker in U.S. Patent 2,891,977 for the manufacture of tetraethyl lead.

It will be understood that the preceding examples are given for illustrative purposes solely, and that this invention is not limited to the specific embodiments described therein. On the other hand, it will be readily apparent to those skilled in the art that, subject to the limitations set forth in the general description, many variations and modifications can be made in the materials, proportions, conditions, and procedures employed without departing from the spirit or scope of this invention.

From the foregoing description and examples, it will be apparent that this invention provides a new and improved process for the manufacture of tetramethyl lead which overcomes problems of the processes of the prior art. Particularly, the process of this invention avoids the hazards of prior processes and makes it possible to produce tetramethyl lead in a relatively safe and more practical manner. Thus, it appears that this invention constitutes a valuable advance in and contribution to the art.

The embodiments of the invention in which an exclusive property or privilege is claimed are defined as follows:

1. The process for making tetramethyl lead which comprises reacting monosodium lead alloy with
    (A) methyl chloride in the liquid phase, employing at least 1 mole of methyl chloride per mole of alloy,
    (B) at a temperature of from 20° C. to 130° C.
    (C) in the presence of a catalyst system which comprises
        (a) from 0.05 to about 1 mole of methylamine per mole of alloy, and
        (b) from 0 to about 0.01 mole of water per mole of alloy.

2. The process for making tetramethyl lead which comprises reacting monosodium lead alloy with
    (A) methyl chloride in the liquid phase, employing at least 1 mole of methyl chloride per mole of alloy,
    (B) at a temperature of about 50° C. to about 90° C.
    (C) in the presence of a catalyst system which comprises
        (a) from 0.05 to about 1 mole of methylamine per mole of alloy, and
        (b) from 0 to about 0.01 mole of water per mole of alloy.

3. The process for making tetramethyl lead which comprises reacting monosodium lead alloy with
    (A) methyl chloride in the liquid phase, employing from about 1.3 to about 6 moles of methyl chloride per mole of alloy,
    (B) at a temperature of from about 50° C. to about 90° C.
    (C) in the presence of a catalyst system which comprises
        (a) from about 0.1 to about 0.5 mole of methylamine per mole of alloy, and
        (b) from 0 to about 0.01 mole of water per mole of alloy.

4. The process for making tetramethyl lead which comprises reacting monosodium lead alloy with
    (A) methyl chloride in the liquid phase, employing at least 1 mole of methyl chloride per mole of alloy,
    (B) at a temperature of from 20° C. to about 130° C.
    (C) in the presence of a catalyst system which comprises
        (a) from about 0.05 to about 1 mole of methylamine per mole of alloy, and
        (b) from about 0.0004 to about 0.01 mole of water per mole of alloy.

5. The process for making tetramethyl lead which comprises reacting monosodium lead alloy with (A) methyl chloride in the liquid phase, employing at least 1 mole of methyl chloride per mole of alloy,
(B) at a temperature of from about 50° C. to about 90° C.
(C) in the presence of a catalyst system which comprises
  (a) from 0.05 to about 1 mole of methylamine per mole of alloy, and
  (b) from about 0.0004 to about 0.01 mole of water per mole of alloy.

6. The process for making tetramethyl lead which comprises reacting monosodium lead alloy with
(A) methyl chloride in the liquid phase, employing from about 1.3 to about 6 moles of methyl chloride per mole of alloy,
(B) at a temperature of from about 50° C. to about 90° C.
(C) in the presence of a catalyst system which comprises
  (a) from about 0.1 to about 0.5 mole of methylamine per mole of alloy, and
  (b) from about 0.0004 to about 0.01 mole of water per mole of alloy.

References Cited

UNITED STATES PATENTS

| | | | |
|---|---|---|---|
| 1,622,228 | 3/1927 | Midgley | 260—437 |
| 2,635,106 | 4/1953 | Shapiro et al. | 260—437 |
| 3,188,333 | 6/1965 | Baird et al. | 260—437 |
| 3,188,334 | 6/1965 | Baird et al. | 260—437 |
| 3,192,240 | 6/1965 | Kobetz et al. | 260—437 |
| 3,226,409 | 12/1965 | Baird et al. | 260—437 |
| 3,281,442 | 10/1966 | Pedrotti et al. | 260—437 |

TOBIAS E. LEVOW, *Primary Examiner.*

H. M. S. SNEED, *Assistant Examiner.*